Patented June 19, 1951

2,557,708

UNITED STATES PATENT OFFICE 2,557,708

3-IODOTHIANAPHTHENE AND PICRATE

Robert T. Van Vleck, Fishkill, N. Y., assignor to The Texas Company, New York, N. Y., a corporation of Delaware No Drawing. Application August 14, 1948, Serial No. 44,398

2 Claims. (Cl. 260—330.5)

This invention relates to the preparation of monoiodothianaphthene and derivatives thereof in which thianaphthene is substituted with iodine in the 3-position. This invention is particularly concerned with the preparation of 3-iodothianaphthene.

3-iodothianaphthene is a liquid boiling at about 137 to 138° C. at 5 mm. pressure. It is believed that 3-iodothianaphthene is useful as an insecticide, a fungicide and as an intermediate in the manufacture of drugs and dyes.

I have prepared 3-iodothianaphthene and several derivatives thereof. The procedure employed in the preparation of 3-iodothianaphthene involves the reaction of iodine with thianaphthene in the presence of mercuric oxide. The reaction is effected in a solvent such as benzene or ligroin.

The following example illustrates this method of preparing 3-iodothianaphthene. However, it is not intended that the invention be limited to this method of preparation.

227 grams of thianaphthene was dissolved in 200 cc. of benzene in a glass-stoppered flask. 436 grams of iodine and 300 grams of mercuric oxide were added alternately in small amounts over a period of about 120 minutes to the benzene solution of thianaphthene, during which additions the flask was continually shaken and cooled in an ice bath. The reaction mixture was filtered and the precipitate was washed with ether. The ether wash and the benzene filtrate were combined, shaken with a dilute solution of sodium thiosulfate to remove excess iodine and then dried over calcium chloride. The ether and benzene were removed from the dried filtrate by distillation and the residual product was fractionally distilled under reduced pressure. 93 grams of crude 3-iodothianaphthene distilling between 145 and 153 at 12 mm. pressure was obtained. This yield amounted to 21.2 mol per cent on the basis of the thianaphthene charged or 31.9 mol per cent on the basis of thianaphthene consumed.

Purified 3-iodothianaphthene has a boiling point of 137 to 138° C. at 5 mm. pressure. Quantitative analysis of the product showed an observed sulfur value of 12.7 per cent and an observed iodine value of 46.7 per cent, as compared with calculated theoretical values of 12.3 and 48.7 per cent respectively. The structural formula of this novel compound is

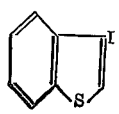

The picrate of 3-iodothianaphthene was prepared by reacting 3-iodothianaphthene with an alcoholic solution of picric acid. The solid material precipitated from the alcoholic solution had a sharply defined melting point of 107 to 108° C. after repeated crystallizations. 3-iodothianaphthene picrate has the following structural formula:

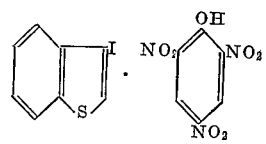

A sulfone of 3-iodothianaphthene was prepared by reacting a mixture containing 50 cc. of 30 per cent hydrogen peroxide, acetic acid and acetic anhydride with 8 grams of 3-iodothianaphthene at reflux for one hour. There was obtained a solid material which, after recrystallization, had a melting point of 197 to 199° C. and which is a sulfone of 3-iodothianaphthene having the following structural formula:

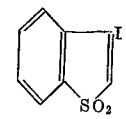

Quantitative analysis of the product showed an observed sulfur value of 10.99 per cent, as compared with a calculated theoretical value of 11.01 per cent.

Obviously many modifications and variations of the invention, as hereinbefore set forth, may be made without departing from the spirit and scope thereof and, therefore, only such limitations should be imposed as are indicated in the appended claims.

I claim:
1. 3-iodothianaphthene.
2. 3-iodothianaphthene picrate.

ROBERT T. VAN VLECK.

REFERENCES CITED

The following references are of record in the file of this patent:

Komppa, J. Prakt. Chem. (2), 122, 321–322 (1929).